US008856495B2

(12) United States Patent
El-Essawy et al.

(10) Patent No.: US 8,856,495 B2
(45) Date of Patent: Oct. 7, 2014

(54) AUTOMATICALLY ROUTING SUPER-COMPUTE INTERCONNECTS

(75) Inventors: Wael R. El-Essawy, Austin, TX (US); David A. Papa, Austin, TX (US); Jarrod A. Roy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 13/189,991

(22) Filed: Jul. 25, 2011

(65) Prior Publication Data

US 2013/0031334 A1      Jan. 31, 2013

(51) Int. Cl.
| G06F 15/00 | (2006.01) |
| G06F 15/173 | (2006.01) |
| H04L 12/721 | (2013.01) |
| H04L 12/751 | (2013.01) |

(52) U.S. Cl.
CPC .... *G06F 15/17312* (2013.01); *G06F 15/17343* (2013.01); *H04L 45/06* (2013.01); *H04L 45/02* (2013.01)
USPC ............................................. 712/29; 712/12

(58) Field of Classification Search
CPC ...................... G06F 15/17343; G06F 15/17356
USPC .......................................... 712/29, 30, 12, 28
See application file for complete search history.

(56) References Cited

U.S. PATENT DOCUMENTS

| 4,873,459 A | 10/1989 | El Gamal et al. |
| 5,014,419 A | 5/1991 | Cray et al. |
| 5,129,830 A | 7/1992 | Krajewski et al. |
| 5,152,696 A | 10/1992 | Krajewski et al. |
| 5,331,315 A * | 7/1994 | Crosette .......................... 712/28 |
| 5,726,902 A | 3/1998 | Mahmood et al. |
| 5,787,459 A * | 7/1998 | Stallmo et al. ................ 711/112 |
| 5,825,661 A | 10/1998 | Drumm |
| 5,896,299 A | 4/1999 | Ginetti et al. |
| 6,080,201 A | 6/2000 | Hojat et al. |
| 6,086,627 A | 7/2000 | Bass, Jr. et al. |

(Continued)

FOREIGN PATENT DOCUMENTS

| JP | 11145297 A | 5/1999 |
| JP | 2000322458 A | 11/2000 |
| JP | 2001134625 A | 5/2001 |
| JP | 2004356780 | 12/2004 |

OTHER PUBLICATIONS

Final Office Action dated Aug. 29, 2012 for U.S. Appl. No. 12/947,445; 10 pages.

(Continued)

*Primary Examiner* — Andrew Caldwell
*Assistant Examiner* — Keith Nielsen
(74) *Attorney, Agent, or Firm* — Francis Lammes; Stephen J. Walder, Jr.; Parashos T. Kalaitzis

(57) ABSTRACT

A mechanism is provided for automatically routing network interconnects in a data processing system. A processor in a node of a plurality of nodes receives network topology from neighboring nodes in the plurality of nodes within the data processing system. The processor constructs a system node map that identifies a physical connectivity between the node and the neighboring nodes. The processor programs a switch in the node with a connectivity map that indicates a set of point-to-point connections with the neighboring nodes. The set of point-to-point connections comprise locally-connected connections and pass-through connections.

18 Claims, 6 Drawing Sheets

(56) References Cited

U.S. PATENT DOCUMENTS

| | | | |
|---|---|---|---|
| 6,094,715 A * | 7/2000 | Wilkinson et al. | 712/20 |
| 6,189,131 B1 | 2/2001 | Graef et al. | |
| 6,230,304 B1 | 5/2001 | Groeneveld et al. | |
| 6,442,745 B1 | 8/2002 | Arunachalam et al. | |
| 6,536,024 B1 | 3/2003 | Hathaway | |
| 6,725,438 B2 | 4/2004 | van Ginneken | |
| 6,973,473 B1 * | 12/2005 | Novaes et al. | 709/201 |
| 7,039,891 B2 | 5/2006 | Tetelbaum | |
| 7,043,562 B2 * | 5/2006 | Dally et al. | 709/238 |
| 7,222,311 B2 | 5/2007 | Kaufman et al. | |
| 7,284,222 B1 | 10/2007 | Rohe et al. | |
| 7,342,414 B2 | 3/2008 | DeHon et al. | |
| 7,367,005 B2 | 4/2008 | Kosugi et al. | |
| 7,379,424 B1 | 5/2008 | Krueger | |
| 7,395,524 B2 | 7/2008 | Roesner et al. | |
| 7,426,186 B2 | 9/2008 | Acharya et al. | |
| 7,555,566 B2 | 6/2009 | Blumrich et al. | |
| 7,613,900 B2 * | 11/2009 | Gonzalez et al. | 712/29 |
| 7,679,401 B1 | 3/2010 | Redgrave | |
| 7,694,242 B1 | 4/2010 | Li et al. | |
| 7,761,687 B2 | 7/2010 | Blumrich et al. | |
| 7,979,732 B2 | 7/2011 | Curley et al. | |
| 8,074,190 B1 | 12/2011 | Li et al. | |
| 8,358,503 B2 * | 1/2013 | Carter et al. | 361/690 |
| 8,370,782 B2 | 2/2013 | Alpert et al. | |
| 8,407,660 B2 | 3/2013 | Solomon | |
| 8,423,940 B2 | 4/2013 | Daellenbach et al. | |
| 2003/0215238 A1 * | 11/2003 | Milton et al. | 398/83 |
| 2004/0128341 A1 * | 7/2004 | Synek et al. | 709/200 |
| 2006/0149506 A1 | 7/2006 | Cutuli et al. | |
| 2008/0022079 A1 * | 1/2008 | Archer et al. | 712/225 |
| 2008/0148203 A1 | 6/2008 | Alpert et al. | |
| 2008/0295073 A1 | 11/2008 | Roesner et al. | |
| 2009/0064073 A1 | 3/2009 | Alpert et al. | |
| 2009/0070549 A1 | 3/2009 | Solomon | |
| 2009/0193376 A1 | 7/2009 | Alpert et al. | |
| 2009/0193377 A1 | 7/2009 | Puri et al. | |
| 2009/0292383 A1 | 11/2009 | Bohl et al. | |
| 2009/0319977 A1 | 12/2009 | Saxena et al. | |
| 2010/0251234 A1 * | 9/2010 | Oshins | 718/1 |
| 2011/0055786 A1 | 3/2011 | Gao | |
| 2011/0055791 A1 | 3/2011 | Gao | |
| 2011/0320992 A1 | 12/2011 | Alpert et al. | |
| 2012/0146099 A1 | 6/2012 | Geer et al. | |
| 2012/0286331 A1 | 11/2012 | Aton et al. | |

OTHER PUBLICATIONS

Interview Summary mailed Nov. 5, 2012 for U.S. Appl. No. 12/947,445; 3 pages.

Response to Final Office Action filed with the USPTO Nov. 19, 2012 for U.S. Appl. No. 12/947,445; 12 pages.

"Cray XT3TM Supercomputer Scalable by Design", Cray XT3 Datasheet, 2004-2005, 6 pages.

Hemenway, Roe et al., "An Optical Packet-Switched Interconnect for Supercomputer Applications*", Submitted as an invited paper in Journal of Optical Networking, Special Issue on Supercomputer Interconnects, Oct. 2004, 16 pages.

Hu, Jin et al., "Completing High-Quality Global Routes", Proc. Int'l. Symp. on Physical Design (ISPD), Mar. 2010, 7 pages.

Lakshin, G. L. et al., "ECL LSI Design and Test Experience in Supercomputer Development", INSPEC, Proceedings of the Third Eurochip Workshop on VLSI Design Training, 21-26, CMP/EUROCHIP, Grenoble, France, 1992, 1 page.

McMurchie, Larry et al., "PathFinder: A Negotiation-Based Performance-Driven Router for FPGAs", In Proc. ACM Symp. on FPGAs, 1995, pp. 111-117.

Moller, Dietmar P. et al., "Simulation of an Embedded Processor Kernel Design on SRAM-Based FPGA", Proceedings of the SCS, Jul. 1999, 6 pages.

Yang, Q. et al., "WDM/TDM Optical Packet Switched Network for Supercomputing", Optics in Computing 2000, SPIE, vol. 4089, 2000, pp. 555-561.

Zhu, Yi et al., "Advancing Supercomputer Performance Through Interconnection Topology Synthesis", IEEE/ACM International conference on Computer-Aided Design (ICCAD), Nov. 10-13, 2008, San Jose, CA, USA, pp. 555-558.

Office Action mailed Feb. 15, 2012 for U.S. Appl. No. 12/947,445; 12 pages.

Response to Office Action field with the USPTO on May 11, 2012 for U.S. Appl. No. 12/947,445, 19 pages.

Papa, David et al., "Physical Synthesis With Clock-Network Optimization for Large Systems on Chips", IEEE Micro, pp. 51-62, Jul. 2011.

USPTO U.S. Appl. No. 13/008,935; 1 page.

Moffitt, Michael D., "Automated Planning in Physical Synthesis", USPTO U.S. Appl. No. 12/855,009, filed Aug. 12, 2010, 37 pages.

Tsai, Jeng-Liang, "Clock Tree Synthesis for Timing Convergence and Timing Yield Improvement in Nanometer Technologies", University of Wisconsin-Madison, 2005, 123 pages. (pp. 1-62).

Tsai Jeng-Liang, "Clock Tree Synthesis for Timing Convergence and Timing Yield Improvement in Nanometer Technologies", University of Wisconsin-Madison, 2005, 123 pages. (pp. 63-123).

Viswanathan, Natarajan et al., "ITOP: Integrating Timing Optimization within Placement", ISPD'10, San Francisco, California, Mar. 14-17, 2010, pp. 83-90.

U.S. Appl. No. 13/572,144, 1 page.

Interview Summary dated Nov. 18, 2013 for U.S. Appl. No. 13/008,935; 3 pages.

Interview Summary dated Dec. 11, 2013 for U.S. Appl. No. 13/572,144; 8 pages.

Notice of Allowance mailed Oct. 15, 2013 for U.S. Appl. No. 12/947,445; 12 pages.

Office Action mailed Sep. 24, 2013 for U.S. Appl. No. 13/572,144; 18 pages.

Office Action mailed Sep. 27, 2013 for U.S. Appl. No. 13/008,935; 22 pages.

Response to Office Action filed Nov. 22, 2013, U.S. Appl. No. 13/008,935, 16 pages.

Response to Office Action filed Dec. 10, 2013, U.S. Appl. No. 13/572,144, 12 pages.

Final Office Action dated Jan. 23, 2014 for U.S. Appl. No. 13/572,144; 19 pages.

Notice of Allowance mailed Dec. 31, 2013 for U.S. Appl. No. 13/008,935; 18 pages.

De Paulo, Vitor et al., "3D Network-on-Chip Architectures Using Homogeneous Meshes and Heterogeneous Floorplans", International Journal of Reconfigurable Computing, vol. 2010, Article ID 603056, Aug. 25, 2010, 12 pages.

Khan, Mohammad A. et al., "Quadrant-Based XYZ Dimension Order Routing Algorithm for 3-D Asymmetric Torus Routing Chip (ATRC)", IEEE, Apr. 22-24, 2011, pp. 121-124.

Kim, Jongman et al., "A Novel Dimensionally-Decomposed Router for On-Chip Communication in 3D Architectures", ISCA '07, ACM, Jun. 9-13, 2007, 12 pages.

* cited by examiner

AUTOMATICALLY ROUTING SUPER-COMPUTE INTERCONNECTS

The present application relates generally to an improved data processing apparatus and method and more specifically to mechanisms for automatically routing super-compute interconnects.

High-performance computing (HPC) uses supercomputers and computer clusters to solve advanced computation problems. The HPC term is most commonly associated with computing used for scientific research. A related term, high-performance technical computing (HPTC), generally refers to the engineering applications of cluster-based computing (such as computational fluid dynamics and the building and testing of virtual prototypes). Recently, HPC has come to be applied to business uses of cluster-based supercomputers, such as data intensive, commercial analytics applications, and transaction processing.

However, traditional HPC systems use symmetric compute and interconnect components. While this approach maintains system simplicity, such systems have limited scalability, and in general don't have an optimal performance. Current systems minimize the maximum required link capacity for a three-dimensional interconnect routing. However, such systems require custom interconnect wiring within each compute node based on a location of the compute node within the HPC system.

SUMMARY

In one illustrative embodiment, a method, in a data processing system, is provided for automatically routing network interconnects. The illustrative embodiment retrieves, for a node of the plurality of nodes, network topology from neighboring nodes in the plurality of nodes within the data processing system. The illustrative embodiment constructs a system node map that identifies a physical connectivity between the node and the neighboring nodes. The illustrative embodiment programs a switch in the node with a connectivity map that indicates a set of point-to-point connections with the neighboring nodes. In the illustrative embodiment, the set of point-to-point connections comprise locally-connected connections and pass-through connections.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As stated previously, current systems require custom interconnect wiring within each compute node based on a location of the compute node within the Performance Computing (HPC) system. The illustrative embodiments address this limitation to maintain an optimal system performance while maintaining a modular design that uses identical system compute nodes. Thus, the illustrative embodiments provide a mechanism for automatically routing super-compute node interconnects. For a given physical infrastructure of nodes and links, the illustrative embodiments provide for automatically configuring switches within each node with interconnect information in order to route signals between nodes in order to satisfy a specified connection topology. At initialization, each node runs a discovery protocol to detect available physical network resources and which compute nodes are connected in the network. After the discovery is completed, the node runs a routing algorithm in order to compute an interconnection between nodes in the network and program a switch within the node accordingly. Whenever the physical infrastructure of compute nodes in the network changes, such as a node being added, a node being removed, a node failing, or the like, each node will query its neighbors for their view of the interconnect routing within the network.

For example, assume that a node with an identifier (ID) X has six neighbors with IDs L, R, F, B, U, and D. Node X may locally detect its neighbors in three dimensions, and encode this information in a connectivity vector like $C_X=(L,R,F,B,U,D)$, where the parameters in sequential order L, R, F, B, U, and D in the connectivity vector for X ($C_X$) refers to the neighbors to node X in the directions Left, Right, Front, Back, Up, and Down, respectively. A whole system map is eventually formed by examining the connectivity vector of all system nodes.

Figure 1:
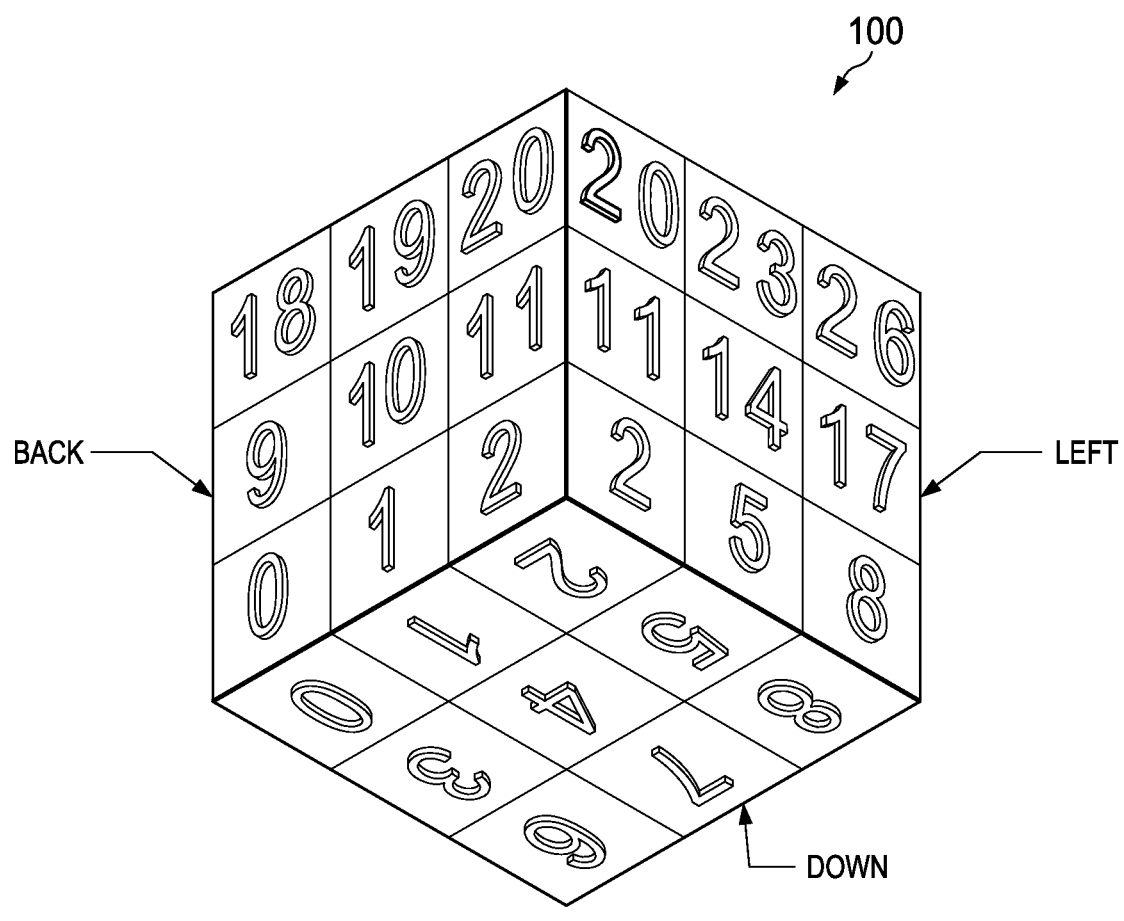
FIG. 1 depicts a whole system example in accordance with an illustrative embodiment.

FIG. 1 depicts a whole system example in accordance with an illustrative embodiment. While system 100 is illustrated as a 3×3×3 cube configuration with nodes 0-26 laid out in sequential order through the xyz coordinates as shown. The only node in this configuration that has six neighbors is node 13, while all remaining nodes 0-12 and 14-26 have five or fewer neighbors. Nodes 0, 2, 6, 8, 18, 20, 24, and 26 each have only three neighbors. When a node does not have a neighboring node in a certain direction, the corresponding connectivity field in the connectivity vector is left empty to indicate that the node is a surface node with no neighbors in that specific direction. If a node has only one empty connectivity field, e.g. nodes 4, 10, 14, 16, and 22, then such a node is a surface node surrounded with nodes on that surface. If the missing connection field is the Left field, then the node is on the Left surface, similarly for all other directions (L, R, F, B, U, and D). If a node has two empty fields, then it is located on the edge of two surfaces. For example, node 1 is located on the surface between the Down and Back surfaces. The nodes with three missing connection fields are corner nodes, where the three missing connectivity field directions identify the corner. Node 0 is on the Right, Down, and Back edge, for example.

in system 100, the connectivity fields may be detected by the following described mechanisms, such that C0=(1, , 3, , 9, )—Right, Back, Down, Corner Node
C1=(2, 1, 4, , 10, )—Back, Down, Edge Node
C2=( , 5, , 11, )—Left, Back, Down, Corner Node
.
.
.
C13=(14, 12, 16, 10, 22, 4)—Center Node
.
.
.
C25=(26, 24, , 22, , 16)—Forward, Top, Edge Node
C26=( , 25, , 23, , 17)—Left, Forward, Top, Corner Node Having this connectivity fields of all nodes available to any processor, the mechanisms of the illustrative embodiments may reconstruct the system cube structure of FIG. 1 or, in general, any three dimensional architecture. For example, the mechanisms of the illustrative embodiments may easily identify all the corner nodes and their corresponding positions, for example, Node 0 is in the Right-Bottom-Down position, Node 2 is in the Left-Bottom-Down position, Node 6 is in the Right-Forward-Down position, Node 8 is in the Left-Forward-Down position, Node 18 is in the Left-Back-Up position, Node 20 is in the Right-Back-Up position, Node 24 is in the Left-Forward-Up position, and Node 26 is in the Left-Forward-Up position. Moreover, the relative positions of neighboring nodes may be easily identified, for example. Node 0's connectivity vector C0 first element is 1, which means that Node 1 is located East of Node 0, sharing the Back and Down surfaces of the cube structure. The mechanisms of the illustrative embodiments may assign Cartesian coordinates to each node and encode the location of every node as Location vectors (Ln) such as L0=(0,0,0), L1=(1,0,0), . . . L26=(3,3,3) following the described mapping procedure.

Therefore, the illustrative embodiments provide mechanisms to reconstruct cube structures by a single node, by all nodes, or by a dedicated node. While a centralized approach saves on computational steps required to calculate the optimized routing algorithm, letting each node calculate a routing solution saves time required to distribute the routing switch map from a central processor to all nodes.

Figure 2:
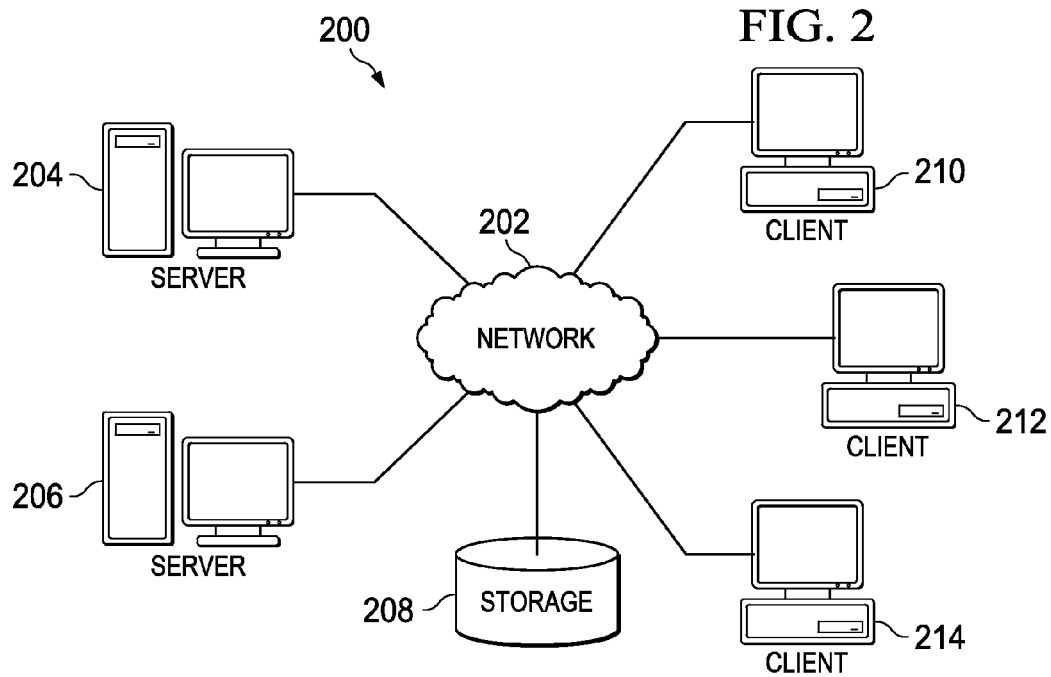
FIG. 2 depicts a pictorial representation of an example distributed data processing system in which aspects of the illustrative embodiments may be implemented.
Figure 3:
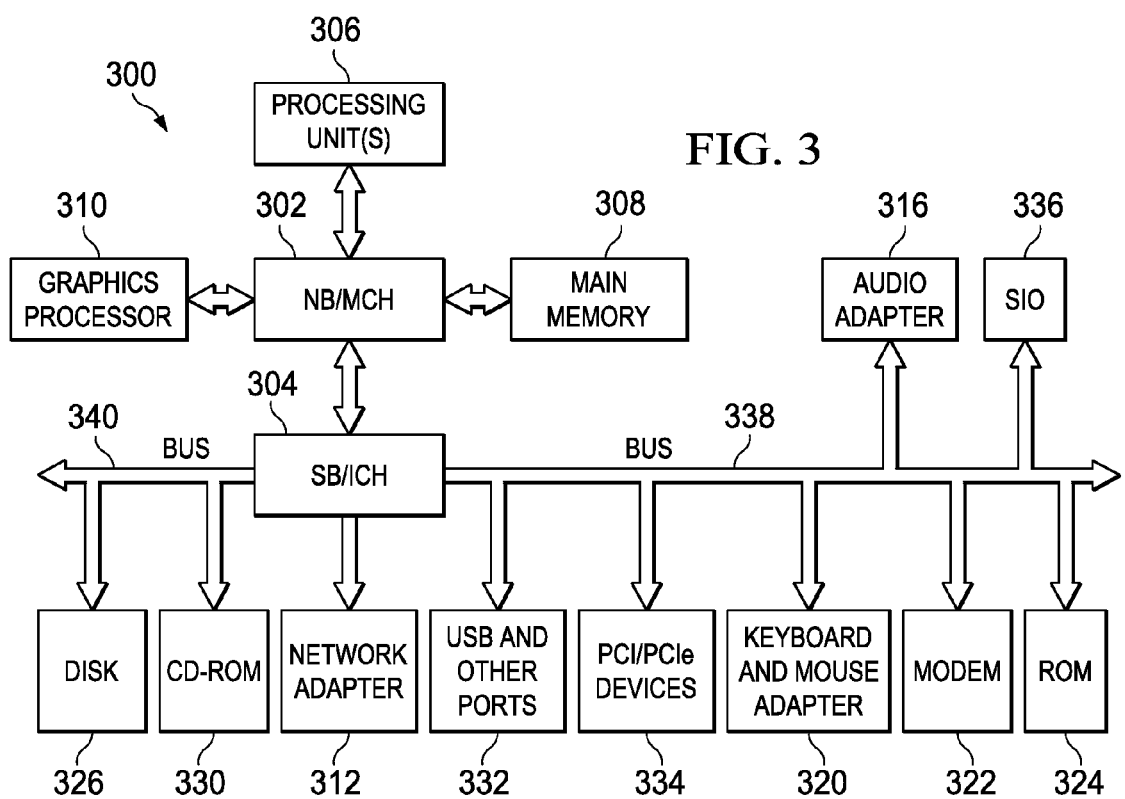
FIG. 3 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 2 and 3 are provided hereafter as example environments in which aspects of the illustrative embodiments may be implemented. It should be appreciated that FIGS. 2-3 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 2 depicts a pictorial representation of an example distributed data processing system in which aspects of the illustrative embodiments may be implemented. Distributed data processing system 200 may include a network of computers in which aspects of the illustrative embodiments may be implemented. The distributed data processing system 200 contains at least one network 202, which is the medium used to provide communication links between various devices and computers connected together within distributed data processing system 200. The network 202 may include connections, such as wire, wireless communication links, or fiber optic cables.

In the depicted example, server 204 and server 206 are connected to network 202 along with storage unit 208. In addition, clients 210, 212, and 214 are also connected to network 202. These clients 210, 212, and 214 may be, for example, personal computers, network computers, or the like. In the depicted example, server 204 provides data, such as boot files, operating system images, and applications to the clients 210, 212, and 214. Clients 210, 212, and 214 are clients to server 204 in the depicted example. Distributed data processing system 200 may include additional servers, clients, and other devices not shown.

In the depicted example, distributed data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 200 may also be implemented to include a number of different types of networks, such as for example, an intranet, a local area network (LAN), a wide area network (WAN), or the like. As stated above, FIG. 2 is intended as an example, not as an architectural limitation for different embodiments of the present invention, and therefore, the particular elements shown in FIG. 2 should not be considered limiting with regard to the environments in which the illustrative embodiments of the present invention may be implemented.

With reference now to FIG. 3, a block diagram of an example data processing system is shown in which aspects of the illustrative embodiments may be implemented. Data processing system 300 is an example of a computer, such as client 210 in FIG. 2, in which computer usable code or instructions implementing the processes for illustrative embodiments of the present invention may be located.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and Peripheral Component Interconnect/Peripheral Component Interconnect Express (PCT/PCIe) devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICE 304.

An operating system runs on processing unit 306. The operating system coordinates and provides control of various components within the data processing system 300 in FIG. 3. As a client, the operating system may be a commercially available operating system such as Microsoft Windows 7 (Microsoft and Windows are trademarks of Microsoft Corporation in the United States, other countries, or both). An Object-oriented programming system, such as the Java programming system, may run in conjunction with the operating system and provides calls to the operating system from Java programs or applications executing on data processing system 300 (Java is a trademark of Oracle and/or its affiliates.).

As a server, data processing system 300 may be, for example, an IBM®eServer™ System p®computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for illustrative embodiments of the present invention may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

Those of ordinary skill in the art will appreciate that the hardware in FIGS. 2-3 may vary depending on the implementation. Other internal hardware or peripheral devices, such as flash memory, equivalent non-volatile memory, or optical disk drives and the like, may be used in addition to or in place of the hardware depicted in FIGS. 2-3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device which is configured with flash memory to provide non-volatile memory for storing operating system files and/or user-generated data, for example. Essentially, data processing system 300 may be any known or later developed data processing system without architectural limitation.

Figure 4:
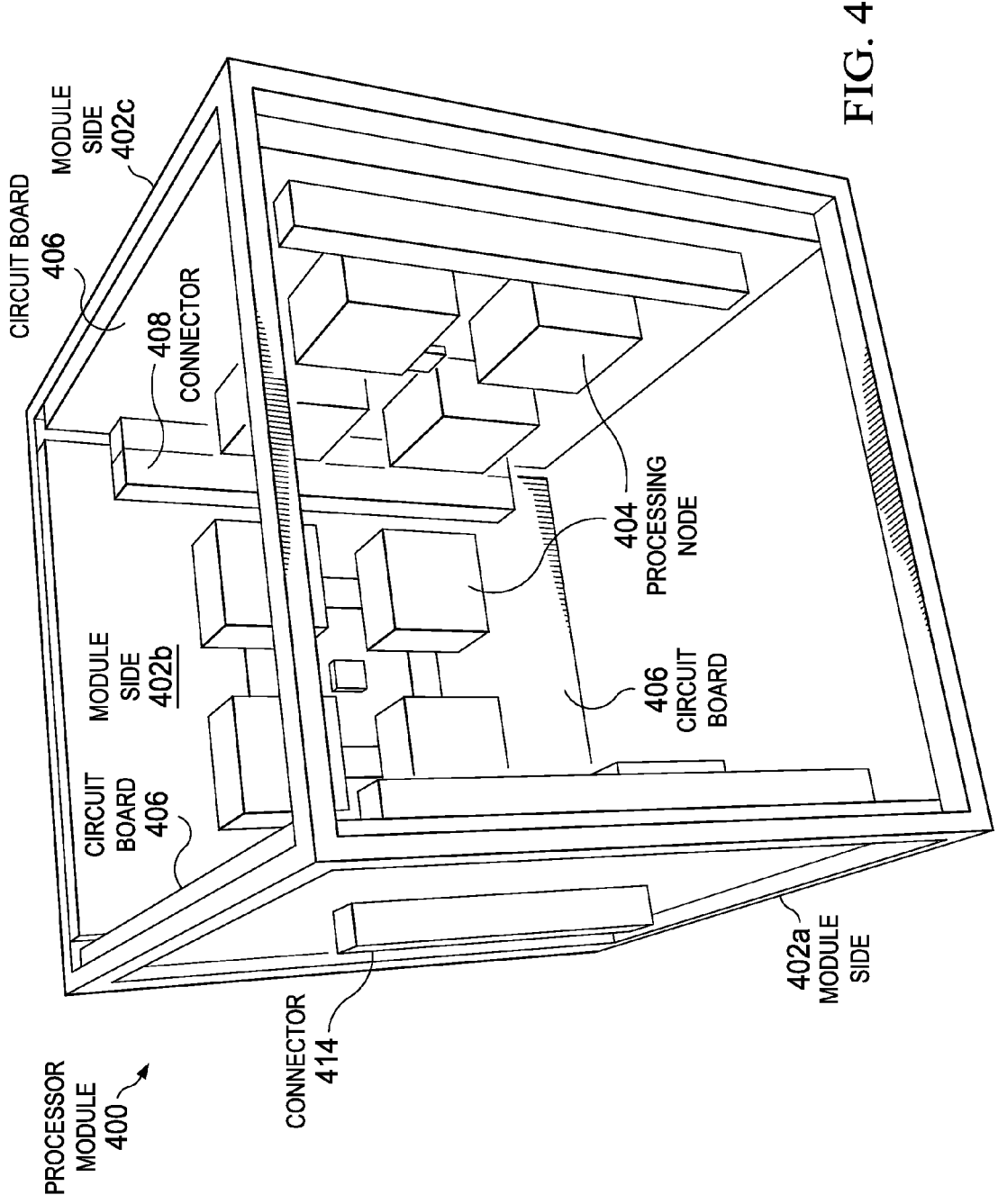
FIG. 4 depicts an exemplary cubical processing module in accordance with an illustrative embodiment.

FIG. 4 depicts an exemplary cubical processing module 400 in accordance with an illustrative embodiment. In FIG. 4 partially constructed processing module 400 shows three processing module sides 402a, 402b, and 402c coupled together. As shown in FIG. 4, processing module side 402b is coupled to processing module side 402c via connectors, such as connectors 408. Furthermore, processing module side 402a is shown to have exterior connector 414 for interfacing with a backplane or point of connection of an electronic system, which will be described in detail below. White only one of exterior connector 414 is shown, depending on implementation, more than one of external connector 414 may be required for interfacing to the electronic system. Each of processing module sides 402a, 402b, and 402c comprise one or more of processing nodes 404 coupled to its respective circuit board 406. Each of processing nodes 404 may comprise memory, processing layers, and connectivity to other ones of processing nodes 404 either coupled directly to circuit board 406 or coupled via connectors 408 to processing nodes on other circuit boards 406. Connectors 408 may be in the form of mechanical couplings, capacitive coupling, or the like. Processing nodes 404 may be coupled directly to circuit board 406 in a manner in which if one of processing nodes 404 fail, the processing node may be removed and replaced with a functional processing node. Similarly, circuit board 406 may also be coupled to processing module side 402 in a manner in which if circuit board 406 fails, the entire circuit board 406 may be removed and replaced with a functional circuit board 406. Each of connectors 408 may be any type of connector that provides connectivity to power, other circuit boards, storage, input/output (I/O), or the like. The connectivity provided by connectors 408 may be wire, fiber optic, or the like. While FIG. 4 only depicts a processing module, any type of module may be used in an electronic system without departing from the spirit and scope of the invention. The other types of modules may include a storage module, an input/output (I/O) module, a filler module, or the like. The filler module of the illustrative embodiments may be a module that provides a way to fill in an empty hole within an electronic system so that air flow may be maintained within the electronic system.

Figure 5:
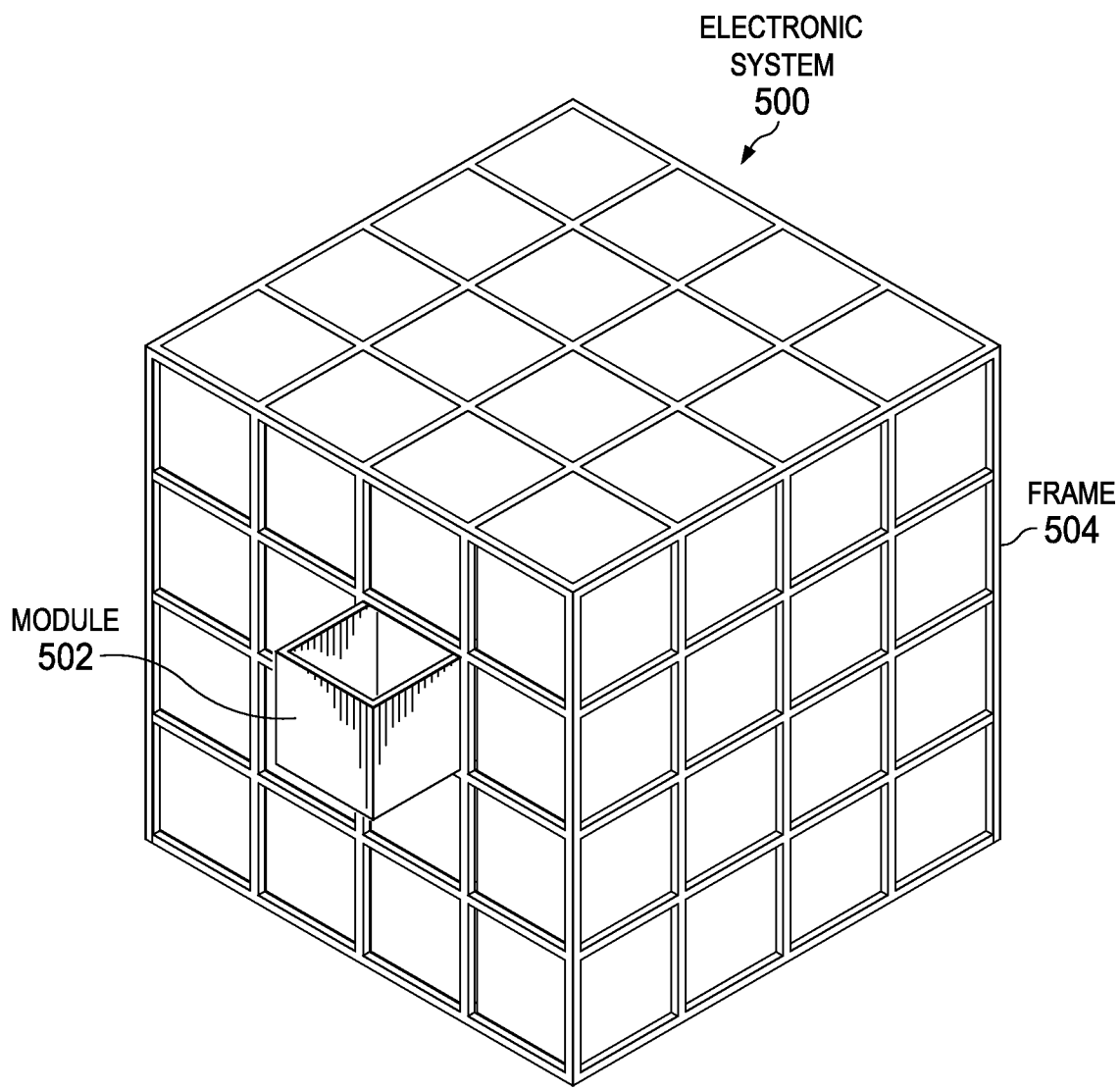
FIG. 5 depicts one example of a scalable space-optimized and energy-efficient electronic system in accordance with an illustrative embodiment.

FIG. 5 depicts one example of a scalable space-optimized and energy-efficient electronic system in accordance with an illustrative embodiment. In FIG. 5, an electronic system 500 provides a compact arrangement of modules 502 configured in frame 504 that reduces communication cost, reduces cooling cost, provides reliable operation, and facilitates maintainability. The modular design of electronic system 500 provides these benefits by assembling the modules in a hexadron (non-regular cube) according to the computing needs of the end-user which reduces distance for the communication links. Each of modules 502 may be either a processing module, a storage module, an input/output (I/O) module, or a filler module and may be installed in frame 504 similar to a drawer as is illustrated or stacked one on top of another (not illustrated).

Figure 6:
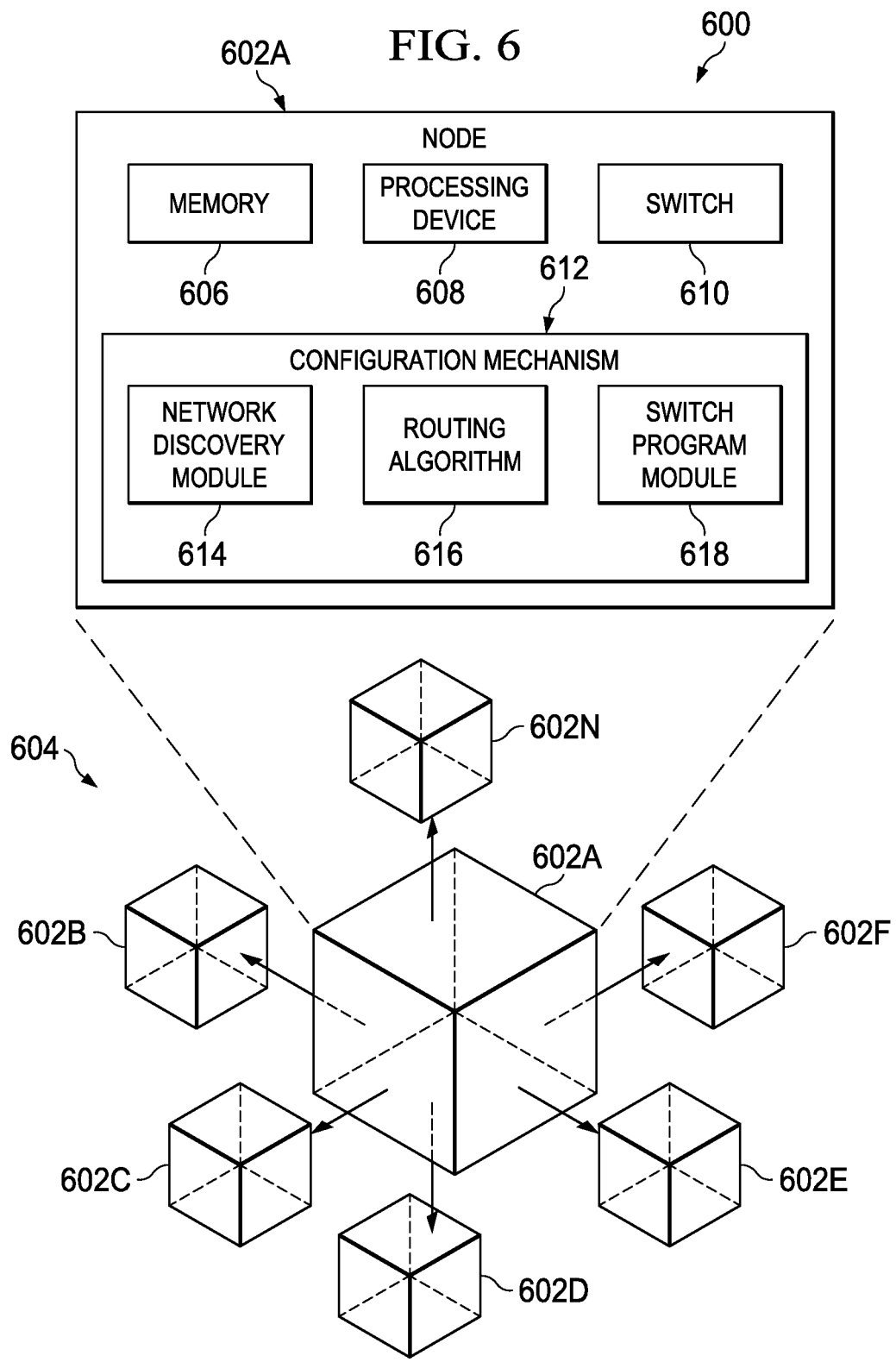
FIG. 6 depicts a block diagram of a mechanism that automatically routes super-compute interconnects in accordance with an illustrative embodiment.

Again, the illustrative embodiments provide a mechanism for automatically routing super-compute node interconnects. For a given physical infrastructure of nodes and links, the illustrative embodiments provide for automatically configuring switches within each node with interconnect information in order to route signals between nodes in order to satisfy a specified connection topology. FIG. 6 depicts a block diagram of a mechanism that automatically routes super-compute interconnects in accordance with an illustrative embodiment. Data processing system 600 comprises a plurality of nodes 602a, 602b, 602c, . . . , and 602n. Each node my be coupled to in a manner such that a single node may be directly coupled to at most six other nodes as in show in coupling view 604, which may be referred to as neighbors. As is described with regard to FIG. 3, each of nodes 602a, 602b, 602c, and 602n comprise memory 606 and processing devices 608 and each of nodes 602a, 602b, 602c, . . . , and 602n have connectivity to other nodes either coupled directly to the circuit board on which the node is attached of or coupled via connectors to nodes on other circuit boards. Additionally, in accordance with the illustrative embodiments, each of nodes 602a, 602b, 602c, . . . , and 602n also have an integrated switch 610 as well as a routing configuration mechanism 612.

Routing configuration mechanism 612 may take the form of an entirely hardware embodiment, an entirely software embodiment (including firmware, resident software, microcode, etc.), or an embodiment combining software and hardware aspects that may all generally be referred to herein as a "circuit," "module," or "system." Thus, routing configuration mechanism 612 may comprise network discovery module 614, routing algorithm 616, and switch programming module 618. In order for each node to automatically route super-compute interconnects, routing configuration mechanism 612 within the node initially uses network discovery module 614 to gather network topology from neighboring nodes in data processing system 600. Upon receiving each network topology, network discovery module 614 aggregates the network topology with all other received network topologies in order to form its own comprehensive network topology as well as identify its immediate neighbors, such as those shown in coupling view 604. Network discovery module 614 then constructs a system node map that identifies each node Cartesian location showing physical connectivity between neighbors as is described in FIG. 1. That is, network discovery module 614 constructs a system node map that uses connectivity vectors for each node Cn and Location vectors (Ln). While coupling view 604 depicts all six neighbors being populated, all six neighbors being present is not always the case in an operational environment. That is, in normal operation, a node may have as few as one neighbor present or up to the maximum of six neighbors.

Network discovery module 614 then broadcasts its system node map to all other nodes in data processing system 600. Upon receiving system node maps from other nodes, network discovery module 614 aggregates its system node map with all other received system node maps in order to form its own comprehensive network topology. That is, network discovery module 614 analyzes the received system node maps to see if there is new information within the system node maps. Network discovery module 614 determines whether the received system node maps differs from previously received system node map information. If no new network topology information is identified, network discovery module performs no further action. However, if new network topology information is identified, network discovery module 614 aggregates the new network topology with all other received system node maps, thereby forming a new comprehensive system node map, which network discovery module 614 broadcasts to all of the other nodes within data processing system 600. Network discovery module 614 repeats this process until no new network topology information is identified for a predetermined number of iterations, thus achieving convergence.

Once convergence for the current configuration is achieved, routing configuration mechanism 612 uses routing algorithm 616 to perform two different determinations. First, routing algorithm 616 determines which interconnections should be generated so that signals that are not intended to terminate within the node or be addressed by the node may be passed through the node without any interaction by the node. That is, based on the identified neighbors, routing algorithm 616 identifies an interconnection from each neighbor to the present node as well as a separate interconnection between the neighbors that are present. Second, routing algorithm 616 identifies a plurality of routing paths, each of which identify a path or connection from the current node to each other node in data processing system 600. That is, once each routing algorithm 616 in each node established its various interconnections, routing algorithm 616 will be able to identify a direct path from the present node to each other node in data processing system 600 that is not acted upon by any intermediate nodes within the path.

Once routing algorithm 616 identifies the interconnections and plurality of routing paths, routing configuration mechanism 612 uses switch program module 618 to program switch 610. Switch program module 618 programs switch 610 with a connectivity map that indicates each point-to-point connection and specifies which of the ports on the six dimension (L, R, F, B, U, D) buses is connected locally to the node hosting the switch and which of these ports are connected in a "pass through" fashion to ports in different dimension.

During the normal operation of data processing system 600 nodes may be added to data processing system 600, removed from data processing system 600, or a switch or a node that is already present in data processing system 600 may fait. While a node failure may only affect the traffic to failing node, a switch failure has the potential to hurt all communications that go through it, which necessitates reconfiguration of the connectivity network. Such events may be detected by network discovery module 614, which may run on a regular basis or at boot time to detect newly added nodes. Additionally, such events may be detected upon a software call at an arbitrary time by the operating system. A node or a switch failure may be detected by a failure of communications during a normal run. In these cases, such a failure may trigger rerouting by taking out the failing node/switch of the system and rerouting the rest of the system network path away from the failing switch. Alternatively, data processing system 600 may rerun network discovery module 614 to verify the health of the overall system network and nodes. Upon identifying such an event, i.e. a change of configuration, the routing configuration may be run again, such that network discovery module 614 analyzes received network topologies to identify the new information within the network topologies. That is, network discovery module 614 determines whether the received network topology differs from previously received network topology information. Since a node has either been added, removed or has failed, new network topology information is identified. Thus, network discovery module 614 aggregates the new network topology with all other received network topologies, forms anew comprehensive network topology, identifies its immediate neighbors, and broadcast the newly formed comprehensive network topology to all of the other nodes within data processing system 600. Network discovery module 614 repeats this process until no new network topology information is identified for a predetermined number of iterations, thus achieving convergence.

Once convergence for the current configuration is achieved, routing configuration mechanism 612 again uses routing algorithm 616 to perform two different determinations: determining which interconnections should be generated so that signals that are not intended to terminate within the node or be addressed by the node may be passed through the node without any interaction by the node and identifying a plurality of routing paths, each of which identify a path or connection from the current node to each other node in data processing system 600. Once routing algorithm 616 identifies the interconnections and plurality of routing paths identified, routing configuration mechanism 612 uses switch program module 618 to program switch 610.

Thus, a mechanism for automatically routing super-compute node interconnects that, for a given physical infrastructure of nodes and links, provides for automatically configuring switches within each node with interconnect information in order to route signals between nodes in order to satisfy a specified connection topology. All nodes have the ability to run the deterministic routing algorithm on the network representation they have and program their own switch accordingly. In an alternative embodiment, data processing system 600 may use a dedicated service processor that determines which interconnections should be generated so that signals that are not intended to terminate within the node or be addressed by the node may be passed through the node without any interaction by the node and identifies plurality of routing paths, each of which identify a path or connection from the current node to each other node in data processing system 600.

Thus, the illustrative embodiments provide a mechanism for automatically routing super-compute node interconnects that is not dependent on all compute nodes being present for proper functioning. Within the illustrative embodiments, added, removed, or failing nodes do not cause system failure in that alternate routing topologies may be exploited. Thus, operation with a variable number of nodes is allowed and additional nodes will be incorporated automatically.

As will be appreciated by one skilled in the art, the present invention may be embodied as a system, method, or computer program product. Accordingly, aspects of the present invention may take the form of an entirety hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer program code embodied therein, for example, in a baseband or as part of a carrier wave. Such a propagated signal may take any of a variety forms, including, but not limited to, electro-magnetic, optical, or any suitable combination thereof. A computer readable signal medium my be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the tatter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 7:
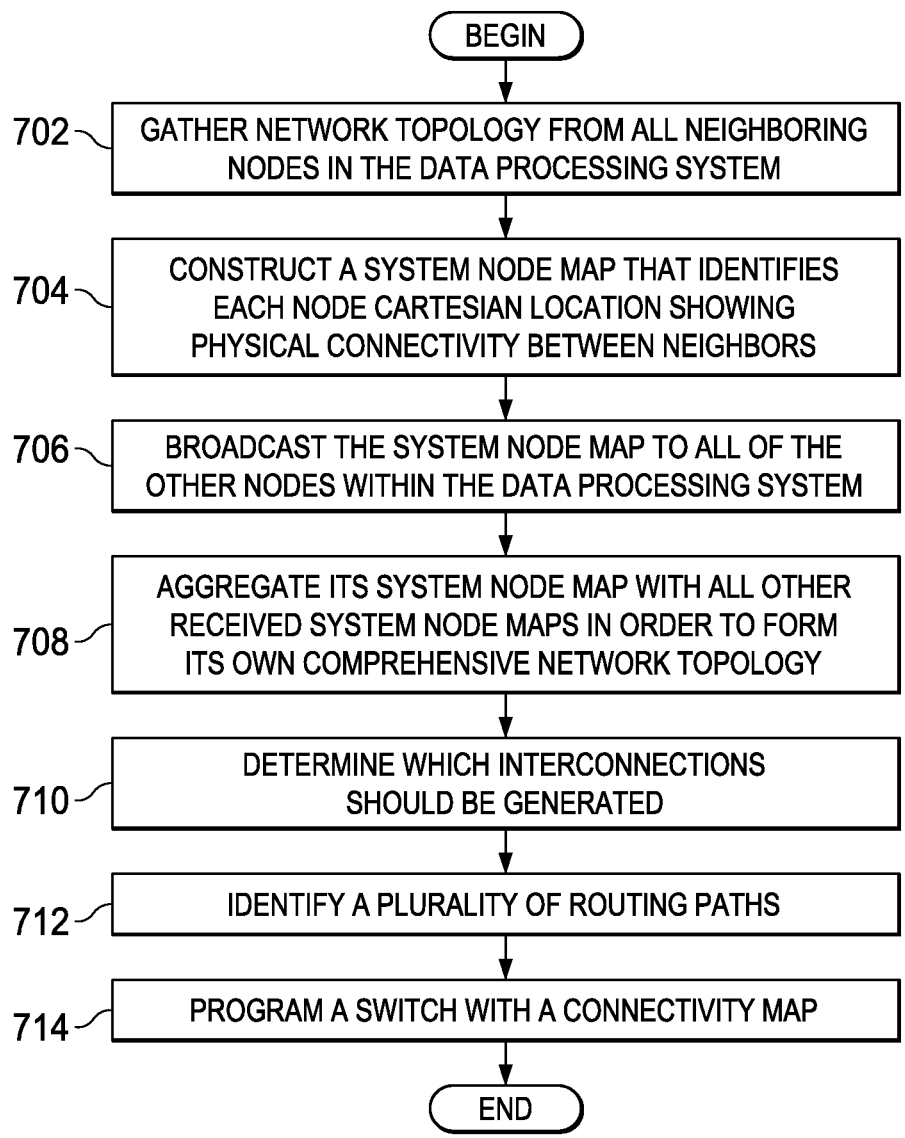
FIG. 7 provides a flowchart outlining example operations of automatically routing super-compute interconnects in accordance with an illustrative embodiment.

Referring now to FIG. 7, this figure provides a flowchart outlining example operations of automatically routing super-compute interconnects in accordance with an illustrative embodiments the operation begins, a routing configuration mechanism executed by a processor within the node initially uses a network discovery module to gather network topology from neighboring nodes in the data processing system (step 702). The network discovery module then constructs a system node map that identifies each node Cartesian location showing physical connectivity between neighbors (step 704). The network discovery module then broadcasts the system node map to all of the other nodes within the data processing system (step 706).

Upon receiving system node maps from other nodes, the network discovery module aggregates its system node map with all other received system node maps in order to form its own comprehensive network topology (step 708). Once convergence is achieved, i.e., no other system node maps are received, the routing configuration mechanism uses a routing algorithm to perform two different determinations. First, the routing algorithm determines which interconnections should be generated so that signals that are not intended to terminate within the node or be addressed by the node may be passed through the node without any interaction by the node (step 710). That is, based on the identified neighbors, the routing algorithm identifies an interconnection from each neighbor to the present node as well as a separate interconnection between the neighbors that are present. Second, the routing algorithm identifies a plurality of routing paths, each of which identify a path or connection from the current node to each other node in the data processing system (step 712). That is, once each routing algorithm in each node has established its various interconnections, the routing algorithm will be able to identify a direct path from the present node to each other node in the data processing system that is not acted upon by any intermediate nodes within the path.

Once the routing algorithm identifies the interconnections and plurality of routing paths, the routing configuration mechanism uses a switch program module to program each switch with a connectivity map that indicates each point-to-point connection and specifies which of the ports on the six dimension (L, R, F, B, D) buses is connected locally to the node hosting the switch and which of these ports are connected in a "pass through" fashion to ports in different dimension (step 714), with the operation ending thereafter.

The operation depicted in FIG. 7 may be performed at boot time or at the occurrence of an event, such as when a node is added to the data processing system, a node is removed from the data processing system, a switch or a node that is already present in the data processing system fails, or an application specifying a needed routing topology. Regardless of when the operation is performed, the operation finishes with programming of the switch(es).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for automatically routing super-compute node interconnects. For a given physical infrastructure of nodes and links, the illustrative embodiments provide for automatically configuring switches within each node with interconnect information in order to route signals between nodes in order to satisfy a specified connection topology. At initialization, each node runs a discovery protocol to detect available physical network resources and which compute nodes are connected in the network. After the discovery is completed, the node runs a routing algorithm in order to compute an interconnection between nodes in the network and program a switch within the node accordingly. Whenever the physical infrastructure of compute nodes in the network changes, such as a node being added, a node being removed, a node failing, or the like, each node will query its neighbors for their view of the interconnect routing within the network. Each node then aggregates the received information into a single view including its own interconnections then broadcasts that update to its neighbors. Upon receiving an update, those neighbors will aggregate all of the new interconnect information into their picture of the network and broadcast it. This querying and broadcasting iterates until the node receives no new interconnect information from two subsequent iterations, thus realizing convergence. All nodes have the ability to run the deterministic routing algorithm on the network representation they have and program their own switch accordingly.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a computing device, causes the computing device to:
retrieve network topology for a node in a data processing system from neighboring nodes in a plurality of nodes within the data processing system;
construct a system node map that identifies a physical connectivity between a node and the neighboring nodes; and
program a switch in the node with a connectivity map that indicates a set of point-to-point connections with and between the neighboring nodes, wherein, once programmed, the set of point-to-point connections comprise a set of locally-connected connections for interaction by the switch and a set of pass-through connections for communication between neighboring nodes without any interaction by the switch, wherein the node is one of a plurality of processing nodes within a modular processing module that comprises a set of processing module sides, wherein each processing module side comprises:
a circuit board;
a plurality of connectors coupled to the circuit board; and
the plurality of processing nodes coupled to the circuit board, wherein each processing module side in the set of processing module sides couples to another processing module side using at least one connector in the plurality of connectors such that when all of the set of processing module sides are coupled together the modular processing module is formed, and wherein the modular processing module comprises an exterior connection to at least one other modular processing module, wherein the exterior connection is comprised in at least one processing module side of the set of processing module sides that couples the circuit board of the at least one processing module side to at least one other modular processing module via a backplane of the computing device, and wherein at least one of the neighboring nodes in the plurality of nodes is in the at least one other modular processing module.

2. The computer program product of claim 1, wherein the computer readable program to receive, construct, and program is performed locally within each node of a plurality of nodes within the data processing system.

3. The computer program product of claim 1, wherein the computer readable program to construct the system node map further causes the computing device to:
broadcast the system node map to all the other nodes within the data processing system;
receive other system node maps from other nodes within the data processing system; and
aggregate the system node map with other system node maps in order to form a comprehensive network topology.

4. The computer program product of claim 1, wherein the locally connected connections are for either sending or receiving signals from other nodes of a plurality of nodes within the data processing system to be acted upon by the node.

5. The computer program product of claim 1, wherein the computer readable program to receive, construct, and program is performed at boot up of the data processing system.

6. The computer program product of claim 1, wherein the computer readable program to receive, construct, and program is performed in response to an event and wherein the event is at least one of a new node being added to the data processing system, a previously installed node being removed from the data processing system, a previously installed switch failing, the previously installed node falling, or an application specifying a needed routing topology.

7. An apparatus, comprising;
a processor; and
a memory coupled to the processor, wherein the memory comprises instructions which, when executed by the processor, cause the processor to;
retrieve network topology for a node in a data processing system from neighboring nodes in a plurality of nodes within the data processing system;
construct a system node map that identifies a physical connectivity between a node and the neighboring nodes; and
program a switch in the node with a connectivity map that indicates a set of point-to-point connections with and between the neighboring nodes, wherein, once programmed, the set of point-to-point connections comprise a set of locally-connected connections for interaction by the switch and a set of pass-through connections for communication between neighboring nodes without any interaction by the switch, wherein the node is one of a plurality of processing nodes within a modular processing module that comprises a set of processing module sides, wherein each processing module side comprises;
a circuit board;
a plurality of connectors coupled to the circuit board; and
the plurality of processing nodes coupled to the circuit board, wherein each processing module side in the set of processing module sides couples to another processing module side using at least one connector in the plurality of connectors such that when all of the set of processing module sides are coupled together the modular processing module is formed, and wherein the modular processing module comprises an exterior connection to at least one other modular processing module, wherein the exterior connection is comprised in at least one processing module side of the set of processing module sides that couples the circuit board of the at least one processing module side to at least one other modular processing module via a backplane of the apparatus, and wherein at least one of the neighboring nodes in the plurality of is in the at east one other modular processing module.

8. The apparatus of claim 7, wherein the instructions to receive, construct, and program is performed locally within each node of a plurality of nodes within the data processing system.

9. The apparatus of claim 7, wherein the instructions to construct the system node map further cause the processor to:
broadcast the system node map to all of the other nodes within the data processing system;
receive other system node maps from other nodes within the data processing system; and
aggregate the system node map with other system node maps in order to form a comprehensive network topology.

10. The apparatus of claim 7, wherein the locally-connected connections are for either sending or receiving signals from other nodes of a plurality of nodes within the data processing system to be acted upon by the node.

11. The apparatus of claim 7, wherein the instructions to receive construct, and program is performed at boot up of the data processing system.

12. The apparatus of claim 7, wherein the instructions to receive, construct, and program is performed in response to an event and wherein the event is at least one of a new node being added to the data processing system, a previously installed node being removed from the data processing system, a previously installed switch failing, the previously installed node failing, or an application specifying a needed routing topology.

13. An electronic system, comprising:
a plurality of modules;
a plurality of connection points, wherein each module of the plurality of modules couples to at least one connection point in the plurality of connection points; and
a programmable switch within each module, wherein the programmable switch is programmed by:
retrieving, by a processor in a node of the module, network topology from neighboring nodes in a plurality of nodes within the electronic system;
constructing, by the processor, a system node map that identifies a physical connectivity between the node and the neighboring nodes; and
programming, by the processor, the programmable switch in the node with a connectivity map that indicates a set of point-to-point connections with and between the neighboring nodes, once the set of point-to-point connections comprise a set of locally-connected connections for interaction by the switch and a set of pass-through connections for communication between neighboring nodes without any interaction by the switch, wherein the node is one of a plurality of processing nodes within the module that comprises a set of processing module sides, wherein each processing module side comprises:
as circuit board;
a plurality of connectors coupled to the circuit board; and
the plurality of processing nodes coupled to the circuit board, wherein each processing module side in the set of processing module sides couples to another processing module side using at least one connector in the plurality of connectors such that when all of the set of processing module sides are coupled to ether the module is formed and wherein the module comprises an exterior connection to at least one other module, wherein the exterior connection is comprised in at least one processing module side of the set of processing module sides that couples the circuit board of the at least one processing module side to at least one other module via a backplane of the electronic system, and wherein at least one of the neighboring nodes in the plurality of nodes is in the at least one other module.

14. The electronic system of claim 13, wherein the receiving, constructing, and programming is performed locally within each node of the plurality of nodes within the data processing system.

15. The electronic system of claim 13, wherein constructing the system node map further comprises:
broadcasting, by the processor, the system node map to all of the other nodes within the data processing system;
receiving, by the processor, other system node maps from other nodes within the data processing system; and
aggregating, by the processor, the system node map with other system node maps in order to form a comprehensive network topology.

16. The electronic system of claim 13, wherein the locally-connected connections are for either sending or receiving signals from other nodes of the plurality of nodes to be acted upon by the node.

17. The electronic system of claim 13, wherein the receiving, constructing, and programming is performed at boot up of the data processing system.

18. The electronic system of claim 13, wherein the receiving, constructing, and programming is performed in response to an event and wherein the event is at least one of a new node being added to the data processing system, a previously installed node being removed from the data processing system, a previously installed switch failing, the previously installed node failing, or an application specifying a needed routing topology.

* * * * *